United States Patent [19]

Hench et al.

[11] 4,135,767

[45] Jan. 23, 1979

[54] APPARATUS FOR DEHUMIDIFYING SOLIDS BEING TRANSPORTED BY A FLOWING GAS

[75] Inventors: Hans H. W. Hench, Grossostheim; Leo K. M. Müller, Mespelbrunn, both of Fed. Rep. of Germany

[73] Assignee: Automatik Apparate-Maschinenbau H. Hench GmbH, Grossostheim, Fed. Rep. of Germany

[21] Appl. No.: 805,841

[22] Filed: Jun. 13, 1977

[30] Foreign Application Priority Data

Jun. 18, 1976 [DE] Fed. Rep. of Germany ....... 2627262

[51] Int. Cl.$^2$ ........................ B65G 53/20; F26B 17/10

[52] U.S. Cl. ...................................... 302/31; 34/57 R; 432/58

[58] Field of Search ........................ 302/29, 31, 45, 47, 302/54; 34/10, 57 R, 57 C, 58; 432/15, 58

[56] References Cited

U.S. PATENT DOCUMENTS

| | | | |
|---|---|---|---|
| 1,019,958 | 3/1912 | Hannam et al. | 34/57 C |
| 1,802,960 | 4/1931 | Simonds | 34/57 C X |
| 1,880,273 | 10/1932 | Pardee et al. | 34/58 |
| 2,085,842 | 7/1937 | Wentworth | 34/10 |
| 3,805,401 | 4/1974 | Fontein | 34/10 |

FOREIGN PATENT DOCUMENTS 1220793 7/1966 Fed. Rep. of Germany ............. 302/31

*Primary Examiner*—Robert W. Saifer
*Assistant Examiner*—James L. Rowland
*Attorney, Agent, or Firm*—W. G. Fasse; W. W. Roberts

[57] ABSTRACT

A drying apparatus for solid materials such as granulated plastics materials comprise a plurality of conveying channels which are arranged in a stack in which the air travels from the bottom of the stack to the top of the stack. Each conveying channel is formed by air supply ducts in such a manner that the top of a duct simultaneously forms the bottom of the next above conveying channel portion whereas the bottom of a duct forms the top of the conveying channel portion. All channel portions are connected in a meandering shape, whereby the interconnecting elements are curved screens through which air may laterally escape.

3 Claims, 3 Drawing Figures

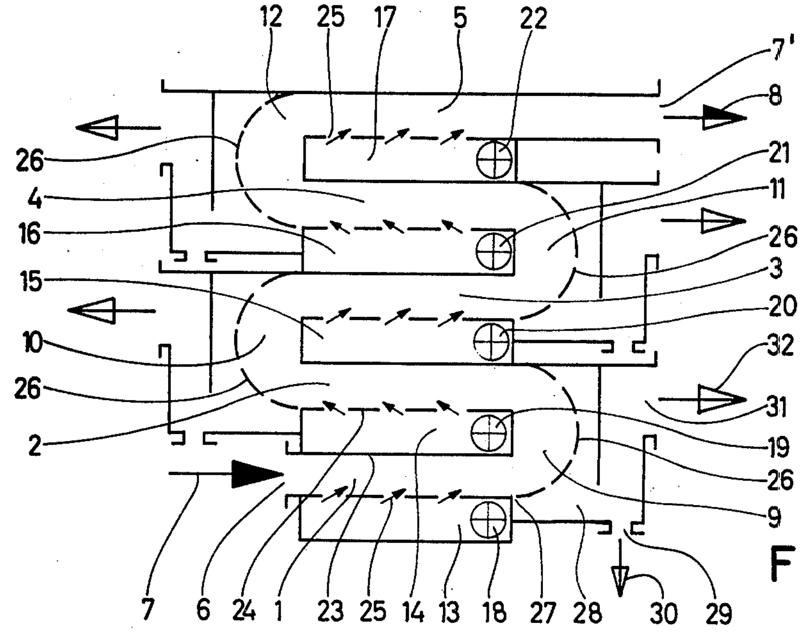
Fig. 1
Fig. 2
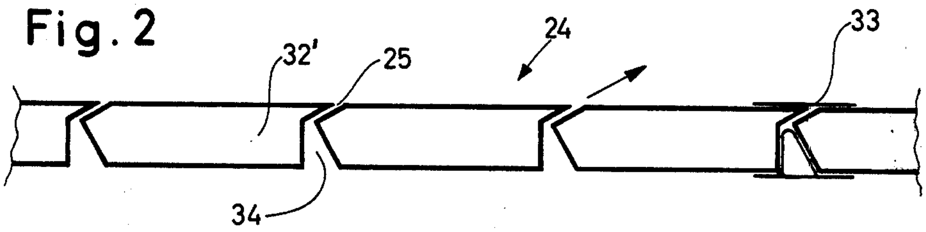
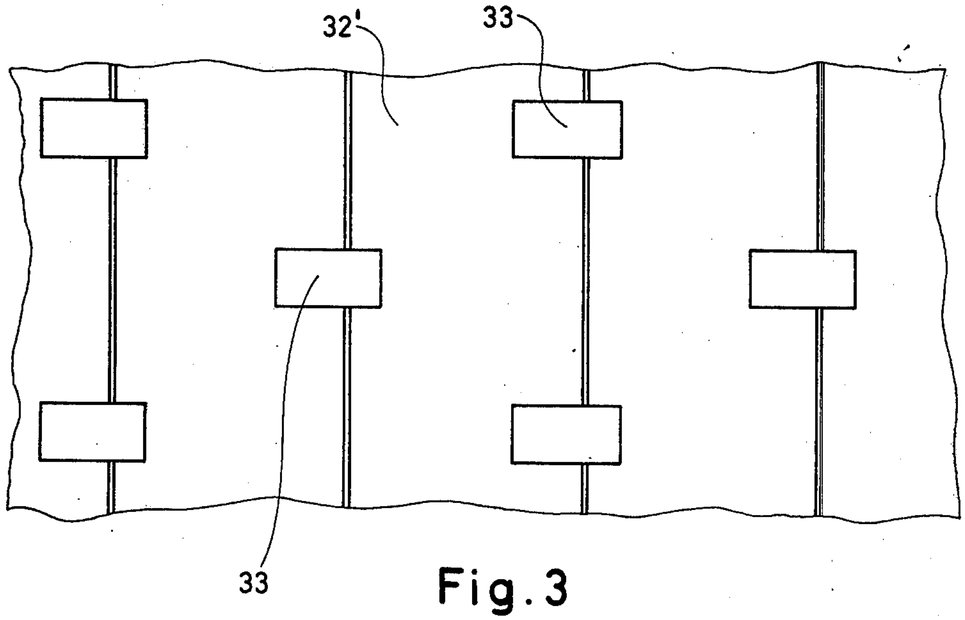
Fig. 3

APPARATUS FOR DEHUMIDIFYING SOLIDS BEING TRANSPORTED BY A FLOWING GAS

BACKGROUND OF THE INVENTION

The invention relates to an apparatus for dehumidifying solids being transported by a flowing gas, in particular plastics granulated under water, by using an elongated pneumatic conveying channel followed by deflecting means provided at its outer wall with a screen. The deflecting means is directed upwardly in the direction of flow.

German Patent Publication (DT-OS) No. 2 231 722 already discloses an apparatus for dehumidifying granulated plastics. With this apparatus moist granulated material as well as compressed air are supplied to the inlet of a horizontal conveying channel. The compressed air serves to transport the moist granulated material in the conveying channel and, at the same time, the liquid adhering to the granulated material is partly torn away from the granulated material. The end of the conveying channel is followed by a deflecting portion which is directed upwardly and the outer wall of which consists of a screen. This deflecting portion changes the flow direction of the granulated material and any liquid still remaining in the granulated material is expelled by centrifugal action. The air which is carrying the moisture leaves through the screen. The velocity imparted to the granulated material by the air is sufficient to convey the granulated material along the deflecting portion until it is discharged at the end of the deflecting portion into a downwardly directed outlet channel. If the dehumidification is insufficient, several of such devices are connected in series behind one another, whereby an outlet channel opens from above into the respective inlet of the next successive conveying channel. Said prior art apparatus or its multiple arrangement requires a relatively large space and particularly high construction expenses because of the individual design of all its structural elements.

Moreover, it is known from German Patent Publication (DT-AS) No. 1 220 793 to convey bulk material downwardly through chutes arranged on top of one another in zig-zag shape and each directed obliquely downwards. The bottom of these chutes is provided with slots to let air enter so that a fluidized bed is formed in the area of the inclined chutes. The air is supplied through an air supply channel disposed below each chute. Upon passing through the slots the air whirls up the bulk material and causes it to flow. Then the air is withdrawn from each chute above the bulk material through a separate air discharge channel. Structurally this means that between two chutes one of which is disposed on top of the other there is positioned an air supply channel as well as an air discharge channel, which makes the structure correspondingly expensive. Furthermore, the known system is not suitable for drying because it does not have any screens in the area of the deflecting portions which connect the ends of the chutes. In the deflecting portions consequently the bulk material merely falls from the upper chute to the one below.

OBJECTS OF THE INVENTION

It is the object of the invention to dehumidify solids which are being transported by a flowing gas, by means of an apparatus of the kind specified initially. It is also an object of the invention to let the solids to travel upwardly while they are being dehumidified. It is another object of the invention to devise a particularly compact structure for the dehumidification of particles while avoiding, greatly involved technical expenditures.

SUMMARY OF THE INVENTION

In accordance with the invention these objects are achieved in that the deflecting portion is succeeded by another conveying channel disposed above said conveying channel, whereby an air supply shaft extends in a manner known as such between the first and the further conveying channels. Air inlet nozzles are distributed along the further conveying channel, the bottom of said air supply shaft coinciding with the top of the conveying channel disposed underneath the supply shaft. The air inlet nozzles are slots which are inclined upwardly in the conveying direction.

In the apparatus according to the invention one air supply shaft only is arranged between each two conveying channels which are disposed on top of each other. The upper and lower wall of the air supply shaft coincide with the respective wall of the conveying channel disposed above or below the same. The air supplied through the air supply channel is discharged in a useful manner with the apparatus according to the invention through the screens disposed in the outer wall of the deflecting portion so that the air stream is utilized not only in the area of the bottom of the conveying channels but above all also in the area of the deflecting portions where it enhances the expelling of moisture from the solids. In this area the solids are forced to follow motions having an arc shape and the centrifugal forces thus occurring effect the expelling of the moisture which is then carried away by the air flowing radially outwardly. The air stream flowing in the area of the deflecting portions is readily sufficient to convey the solids through the deflecting portions until they again reach the area of the air inlet nozzles of the next successive higher conveying channel. The combination of the walls of the conveying channels and of the air supply shafts results in a relatively inexpensive structure and at the same time affords particularly intensive dehumidification because of the air flows through the solids not only in the area of the conveying channels but also in that of the deflecting portions. The effect thus exploited of conveying the solids upwardly is important especially in connection with granulated plastics because normally a certain conveying height is required for passing on such materials. Another favorable aspect resides in the low supply level because often granulators have a low outlet out of which the granulated material mixed with water can issue without pressure.

Conveniently the bottoms of the conveying channels and, at the same time, the tops of the air supply shafts are constituted by sectional bars positioned in transverse direction and separated from one another by slots which are inclined upwardly in the conveying direction. Such sectional bars can be produced easily and thus do not require any expensive structure for the air inlet nozzles for supplying the pressurized gas to the conveying channels.

BRIEF FIGURE DESCRIPTION

The invention will be described further, by way of example, with reference to the accompanying drawings, in which:

FIG. 1 is a basic side sectional view of the present apparatus;

FIG. 2 shows the bottom of the conveying channel or the top of the air supply shaft made of sectional bars;

FIG. 3 is a top plan view of the arrangement according to FIG. 2.

DETAILED DESCRIPTION OF PREFERRED EXAMPLE EMBODIMENTS

The apparatus shown in FIG. 1 comprises the pneumatic conveying channels 1, 2, 3, 4, and 5 disposed on top of one another in meander fashion. The moist granulated material is supplied to the inlet 6 of conveying channel 1, as shown by the arrow 7. The dehumidified granulated material is then withdrawn from the outlet 7' of conveying channel 5, as shown by arrow 8. The conveying channels 1 to 5 are interconnected by means of essentially semicircular deflecting portions 9, 10, 11, and 12, thus forming a closed meander-shaped channel from inlet 6 to outlet 7'. Air supply shafts 13, 14, 15, 16, and 17 are disposed below the conveying channels 1 to 5. They are each supplied with compressed air through pressure air connections 18, 19, 20, 21, and 22. In this context it should be noted that, of course, another gas than air can be used, if required. However, the usual flow medium is air. The air supply shafts 13 to 17 are arranged such that their bottoms each form the tops of the respective pneumatic conveying channel disposed underneath and that their tops form the bottoms of the respective pneumatic conveying channel disposed above the respective air supply shaft. The respective structural elements are marked with reference numerals only in connection with the conveying channel 1, the air supply shaft 14, and the conveying channel 2 in order to simplify the illustration. Reference numeral 23 marks the bottom of air supply shaft 14 and the top of conveying channel 1, respectively, while reference numeral 24 marks the bottom of conveying channel 2 and the top of air supply shaft 14, respectively. These structural elements are shown in FIG. 1 to be a single structural element. However, of course, it is also possible to design the respective structural elements as separate elements and then combine them in structure, for instance, by screwing, riveting or welding. The tops of all the air supply shafts 13 to 17, more specifically top 24 of air supply shaft 14, are provided along the respective superposed conveying channel with from one to five air inlet nozzles (see reference numeral 25 in connection with conveying channels 1 and 5). These air inlet nozzles are inclined upwardly such that the pressurized air flowing out of the air inlet nozzles 25 imparts a strong propelling force to the granulated material being transported in the conveying channels 1 to 5. As the air inlet nozzles 25 are distributed along the respective conveying channels 1 to 5, the granulated material is accelerated considerably in each conveying channel from its entry until its exit. The velocity which the granulated material is finally given is sufficient to propel the granulated material through the deflecting portions 9 to 12 by virtue of its kinetic energy. As the granulated material receives the respective kinetic energy before each deflecting portion, it is automatically conveyed to the topmost conveying channel 5 where it is again accelerated so that it issues at sufficient speed from the outlet 7' of conveying channel 5.

The moisture is withdrawn from the moist granulated material in conveying channels 1 to 5 and, above all, also in the deflecting portions 9 to 12. In the conveying channels the air which quickly passes along the granulated material tears away the liquid adhering to the granulated material. Moreover, the air also dries liquid which is contained in the granulated material. When passing along the deflecting portions 9 to 12 the granulated material in effect must move through a circular path and the resulting centrifugal force greatly intensifies the effect of expelling water. The water expelled in deflecting portions 9 to 12 passes through the outer walls of deflecting portions 9 to 12 since these are designed as screens 26. The screens may be mesh material or composed of bars.

A water outlet 27 (see conveying channel 1) is provided at the end of each conveying channel 1 to 5 or at the beginning of each deflecting portion 9 to 12. The water separated along the respective conveying channel 1 to 5 is discharged through these outlets. The water is received in a collector space (marked by reference numeral 28 in connection with conveying channel 1 and deflecting portion 9). This collector space also receives the water which passes through the arcuate screens 26. A similar collector space is provided in connection with each deflecting portion 9 to 12. From the collector space, which also takes up air through the arcuate screens 26, the water is finally discharged through the water outlet 29 in the direction of arrow 30, while the air is discharged through the air outlet 31 in the direction of arrow 32. The respective reference numerals are shown only for collector space 28, whereas they are left out for the other collector spaces for reasons of clarity.

The channels, shafts, and spaces provided in the apparatus are separated from one another by walls made from sheet material which are shown only diagrammatically in FIG. 1.

With the apparatus shown in FIG. 1 conveyance of the humid granulated material supplied in the direction of arrow 7 is effected from the bottom to the top so that an elevation is carried out. Of course, the apparatus can also be operated in the opposite direction, in which case the air inlet nozzles 25 would have to be oriented in the opposite direction.

FIG. 2 is a side elevational view of the bottom 24 of a conveying channel or the top of an air supply shaft alone. It is formed by sectional bars 32' extending transversely of the conveying direction and preferably being made from plastics. These sectional bars are supported in the sidewalls (not shown) of the apparatus and held in defined distances from one another by spacers 33. Between the sectional bars 32' a space each is left which, on the one hand, serves as an air inlet 34 from the air supply shaft disposed underneath and, on the other hand, is designed as an upwardly inclined air outlet nozzle 25.

FIG. 3 is a top plan view of the arrangement according to FIG. 1. It shows that the spacers 33 are arranged offset with respect to one another so as to produce the most even air stream in the respective conveying channel.

Although the invention has been described with reference to specific example embodiments, it is to be understood that it is intended to cover all modifications and equivalents within the scope of the appended claims.

What is claimed is:

1. An apparatus for dehumidifying solid materials which are being transported by a flowing gas stream, comprising a plurality of pneumatic conveying channel means arranged to form a stack, means operatively interconnecting adjacent ends of said conveying channels to form a meandering flow passage having an inlet port at the bottom end of the stack and an outlet port at the top end of the stack, air supply duct means operatively interposed between adjacent conveying channel means, each air supply duct means having bottom means and cover means arranged in such a manner that a bottom of an air supply duct simultaneously forms the top of the conveying channel next below said air supply duct, said air supply ducts having air slots in the respective cover means slanted in such a direction that the air travels from said bottom end of the stack upwardly to said outlet port at the top end of the stack, said means which operatively interconnect said conveying channel means comprising curved screen means forming guide means from one conveying channel means into the next adjacent conveying channel means, and air outlet means arranged for cooperation with the respective one of said curved screen means whereby air may be partially discharged through said air outlet means along said stack.

2. The apparatus of claim 1, wherein said cover means of said air supply ducts form simultaneously bottom means for the next above conveying channel means, said cover means comprising sectional bars positioned transversely across the respective conveying channel means, said sectional bars being separated by air slots at least partially inclined upwardly in the conveying direction.

3. The apparatus of claim 2, wherein each of said air slots comprises a first portion facing into the respective air supply duct and acting as an air inlet, and a second portion inclined in the conveying direction and acting as an air exit nozzles for supplying air into said conveying channel means.

* * * * *